United States Patent
Murai et al.

[19]

[11] Patent Number: 6,160,604
[45] Date of Patent: Dec. 12, 2000

[54] LIQUID CRYSTAL DISPLAY WITH PIXEL ELECTRODE HAVING APERTURE CONTAINING ADDITIONAL ELECTRODE

[75] Inventors: Hideya Murai; Teruaki Suzuki; Masayoshi Suzuki, all of Tokyo, Japan

[73] Assignee: NEC Corporation, Tokyo, Japan

[21] Appl. No.: 09/359,710

[22] Filed: Jul. 23, 1999

Related U.S. Application Data

[62] Division of application No. 08/841,103, Apr. 30, 1997, Pat. No. 5,963,290.

[30] Foreign Application Priority Data

May 1, 1996 [JP] Japan ................................. 8-110674
Dec. 10, 1996 [JP] Japan ................................. 8-330063

[51] Int. Cl.$^7$ ............................................... G02F 1/1343
[52] U.S. Cl. ..................................... 349/143; 349/141
[58] Field of Search ................................ 349/141, 143, 349/129

[56] References Cited

U.S. PATENT DOCUMENTS

| | | | |
|---|---|---|---|
| 5,013,137 | 5/1991 | Tsuoboyama et al. . | |
| 5,245,450 | 9/1993 | Ukai et al. | 349/85 |
| 5,309,364 | 5/1994 | Lien et al. . | |
| 5,504,604 | 4/1996 | Takatori et al. | 349/75 |
| 5,710,611 | 1/1998 | Suzuki et al. . | |
| 5,748,276 | 5/1998 | Uno et al. | 349/85 |
| 5,946,066 | 8/1999 | Lee et al. | 349/141 |

FOREIGN PATENT DOCUMENTS

| | | |
|---|---|---|
| 0 549 283 | 6/1993 | European Pat. Off. . |
| 63-106624 | 5/1988 | Japan . |
| 6-43461 | 2/1994 | Japan . |
| 7-273614 | 9/1995 | Japan . |
| 2 213 305 | 8/1989 | United Kingdom . |

OTHER PUBLICATIONS

Y. Iimura et al., "Electro-optic characteristics of amorphous and super-multidomain TN-LCDs prepared by a non-rubbing method", pp. 915–918, SID International Symposium Digest of Technical Papers, San Jose, Jun. 14–16, 1994.

N. Koma et al., "No-rub multi-domain TFT-LCD using surrounding -electrode method", pp. 869–872, SID International Symposium Digest of Technical Papers, Orlando, May 23–25, 1995.

*Primary Examiner*—Kenneth Parker
*Attorney, Agent, or Firm*—Young & Thompson

[57] ABSTRACT

An LCD (Liquid Crystal Display) including two substrates sandwiching an LC layer therebetween, and causing a plurality of different kinds of regions to coexist in the LC layer is disclosed. An electrode formed with an aperture is provided on at least one of the substrates. A second electrode is also provided on the same substrate as the above electrode in alignment with the electrode. A voltage higher than a voltage to be applied between the electrode with the aperture and a counter electrode facing it is applied between the second electrode and the counter electrode, thereby controlling the rising direction of LC molecules. The LCD is easy to produce and achieves a great viewing angle. In addition, the LC contains a polymer in order to fix the rising directions of the LC molecules.

3 Claims, 11 Drawing Sheets

LIQUID CRYSTAL DISPLAY WITH PIXEL ELECTRODE HAVING APERTURE CONTAINING ADDITIONAL ELECTRODE

CROSS-REFERENCE TO RELATED APPLICATIONS

This application is a division of application Ser. No. 08/841,103, filed Apr. 30, 1997 U.S. Pat. No. 5,963,290.

BACKGROUND OF THE INVENTION

The present invention relates to an LCD (Liquid Crystal Display) for displaying images including texts and graphics and, more particularly, to a method of producing and driving an LCD which is easy to produce and has a desirable viewing angle characteristic.

In a TN (Twisted Nematic) type LCD extensively used today, while a voltage is not applied, LC molecules are parallel to the surfaces of substrates and render "white". On the application of a voltage, the molecules change their director in the direction of an electric field. As a result, sequential transition occurs from the "white" state to a "black" state. However, the viewing angle available with the conventional LCD is limited due to the behavior of the molecules occurring in response to the voltage. The limited viewing angle is particularly noticeable in the rising direction of LC molecules in the event of halftone display.

Implementations for improving the viewing angle are taught in, e.g., Japanese Patent Laid-Open Publication Nos. 63-106624 (Prior Art 1 hereinafter) and 6-43461 (Prior Art 2 hereinafter). The problem with Prior Art 1 is that it is not practicable without resorting to a photoresist step and a plurality of rubbing steps not necessary for the production of ordinary TN type LCDs. Prior Art 2 needs various kinds of microtreatment including a photoresist step for a common electrode and not necessary for the production of ordinary TN type LCDs. Further, the two substrates must be put together by a highly advanced technology. Moreover, when a voltage is applied to an electrode, it is likely that a sufficient electric field does not act in a certain portion, preventing the LC from sufficiently responding to the applied voltage. This lowers contrast available with the LCD.

SUMMARY OF THE INVENTION

It is therefore an object of the present invention to provide a method of producing and driving an LCD easy to produce, excellent in viewing angle characteristic, and high contrast.

In accordance with the present invention, an LCD has two substrates, an LC layer sandwiched between the two substrates and causing a plurality of regions of different kinds to coexist therein, a first electrode provided on at least one of the two electrodes and formed with an aperture, and a second electrode provided on the one electrode in alignment with the aperture.

Also, in accordance with the present invention, an LCD has two substrates, an LC layer sandwiched between the two substrates and causing a plurality of regions of different kinds to coexist therein, a first electrode provided on at least one of the two substrates, and a second electrode provided on, but insulated from, the first electrode.

Further, in accordance with the present invention, a method of producing an LCD includes the step of preparing an empty panel having two substrates, a first electrode provided on at least one of the two substrates and formed with an aperture, and a second electrode provided on the one substrate in alignment with the first electrode. After LC has been injected into the empty panel, the panel is cooled from a temperature higher than the isotropic phase-LC layer transition temperature of LC to a temperature lower than the transition temperature while a voltage higher than a voltage to be applied between the first electrode and a third electrode facing the first electrode is applied between the second electrode and the third electrode.

Moreover, in accordance with the present invention, a method of producing an LCD includes the step of preparing an empty panel having two substrates, a first electrode provided on at least one of the two substrates, and a second electrode provided on, but insulated from, the first electrode. After LC has been injected into the empty panel, the panel is cooled from a temperature higher than the isotropic phase-LC layer transition temperature of LC to a temperature lower than the transition temperature while a voltage higher than a voltage to be applied between the first electrode and a third electrode facing the first electrode is applied between the second electrode and the third electrode.

BRIEF DESCRIPTION OF THE DRAWINGS

The above and other objects, features and advantages of the present invention will become apparent from the following detailed description taken with the accompanying drawings in which.

In the drawings, identical reference numerals denote identical structural elements.

DESCRIPTION OF THE PREFERRED EMBODIMENTS

To better understand the present invention, brief reference will be made to a conventional TN type LCD. While a voltage is not applied to this type of LCD, LC molecules are parallel to the surfaces of substrates and render "white". On the application of a voltage, the molecules change their director in the direction of an electric field. As a result, sequential transition occurs from the "white" state to a "black" state. However, the viewing angle available with the conventional LCD is limited due to the behavior of the molecules occurring in response to the voltage.

Figure 1:
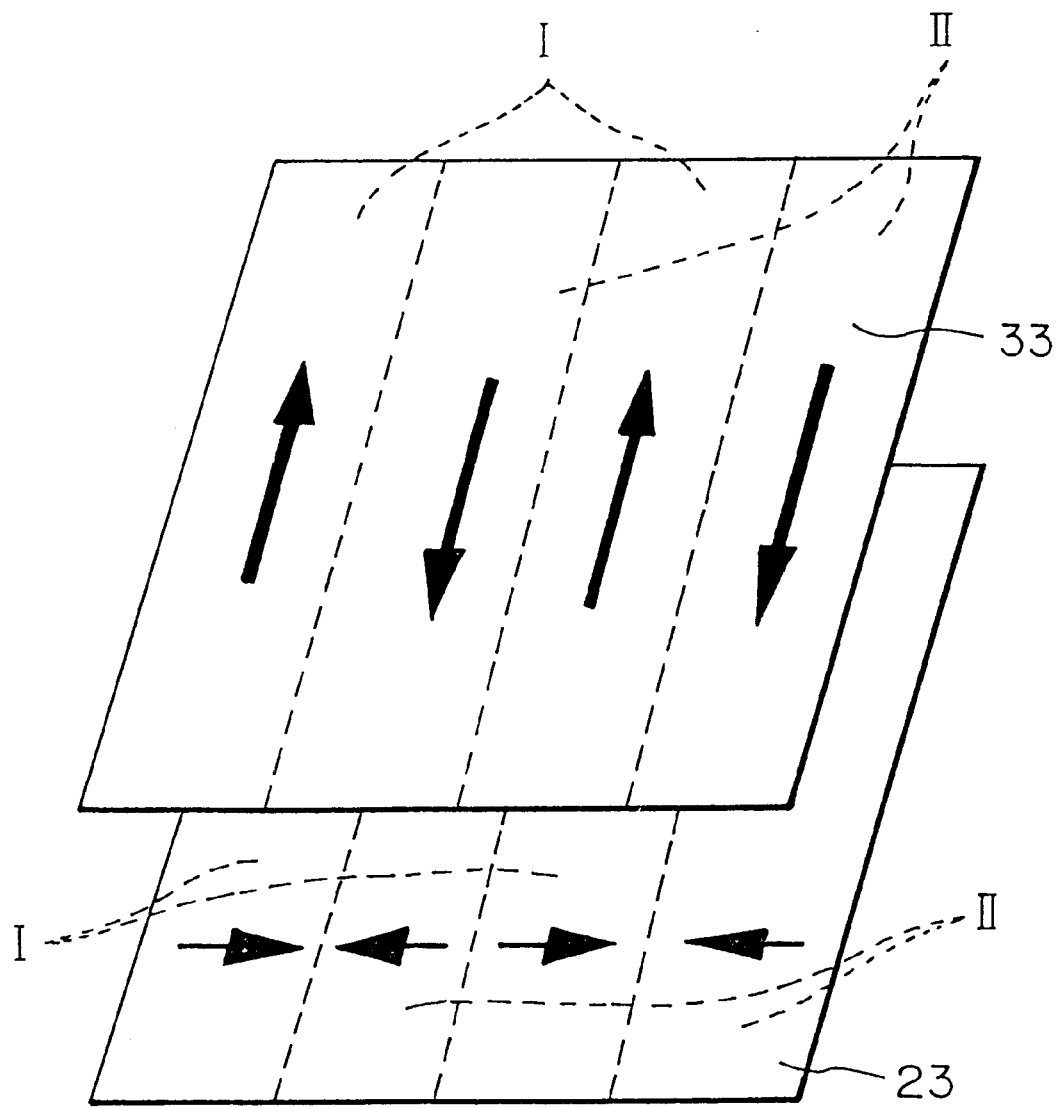
FIG. 1 a view showing rubbing directions particular to a panel included in a conventional TN type LCD.

The implementation for improving the viewing angle and taught in, e.g., Laid-Open Publication No. 63-106624 mentioned earlier (Prior Art 1 hereinafter) will be described with reference to FIG. 1. There are shown in FIG. 1 glass substrates 23 and 33 facing each other. As shown, the glass substrates 23 and 33 each is divided by a microrubbing technology into a plurality of areas, i.e., areas I and II each having a particular rubbing direction on a pixel basis. In this condition, LC molecules rise in opposite directions and improve the viewing characteristic. The problem with Prior Art 1 is that it is not practicable without resorting to a photoresist step and a plurality of rubbing steps not necessary for the production of ordinary TN type LCDs.

Figure 2:
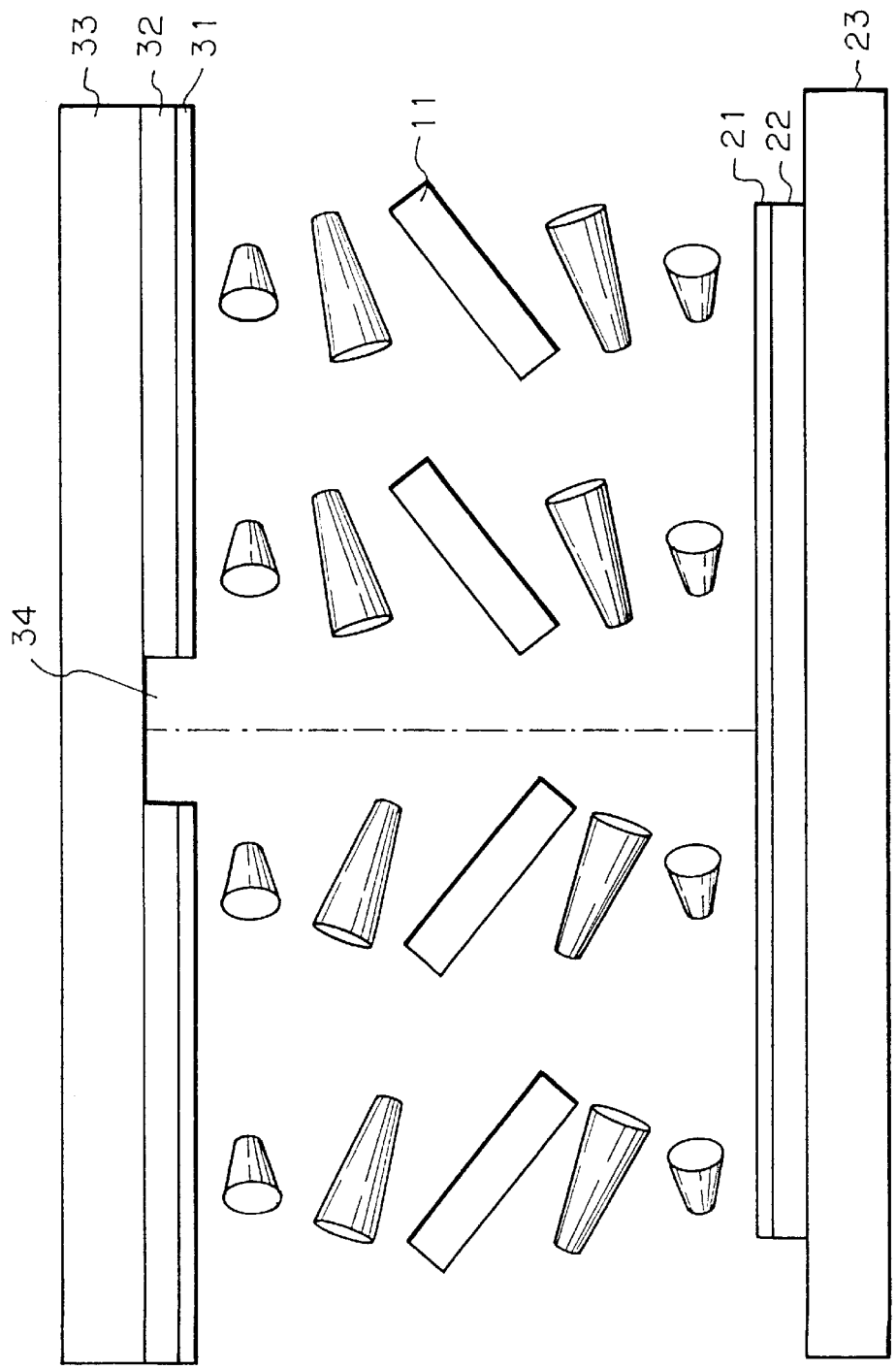
FIG. 2 is a section showing another conventional LCD.

Laid-Open Publication No. 6-43461 also mentioned earlier proposes a technology for improving the viewing characteristic without resorting to microrubbing (Prior Art 2). As shown in FIG. 2, Prior Art 2 includes a common electrode 32 formed with an aperture or void 34 for generating a non-uniform electric field in the individual pixel. As a result, each pixel is divided into two or more LC domains, improving the TN viewing characteristic. Specifically, when a voltage is applied between the electrode 32 and an electrode 22 facing it, the aperture 34 generates a non-uniform electric field and thereby causes LC molecules 11 to rise in different directions. There are also shown in FIG. 2 alignment layers 21 and 31 and substrates 23 and 33.

Prior Art 2 has some problems yet to be solved, as follows. First, Prior Art 2 needs various kinds of microtreatment including a photoresist step for the common electrode 32 and not necessary for the production of ordinary TN type LCDs. Second, the two substrates 23 and 33 must be put together by a highly advanced technology. Specifically, an ordinary TFT (Thin Film Transistor) or similar active matrix LCD has thin film diodes or similar active elements formed on only one of two glass substrates by, e.g., a photoresist process. The other substrate, generally called a common electrode, is simply formed with an electrode over its entire surface. Moreover, because the electrode is absent at the aperture 34, as shown in FIG. 2, it is likely that a sufficient electric field does not act on the portion around the aperture 34, preventing the LC from sufficiently responding to the applied voltage. Particularly, because an ordinary LCD renders white while the voltage is not applied, the insufficient response of the LC prevents black from being clearly rendered and lowers contrast.

Figure 3:
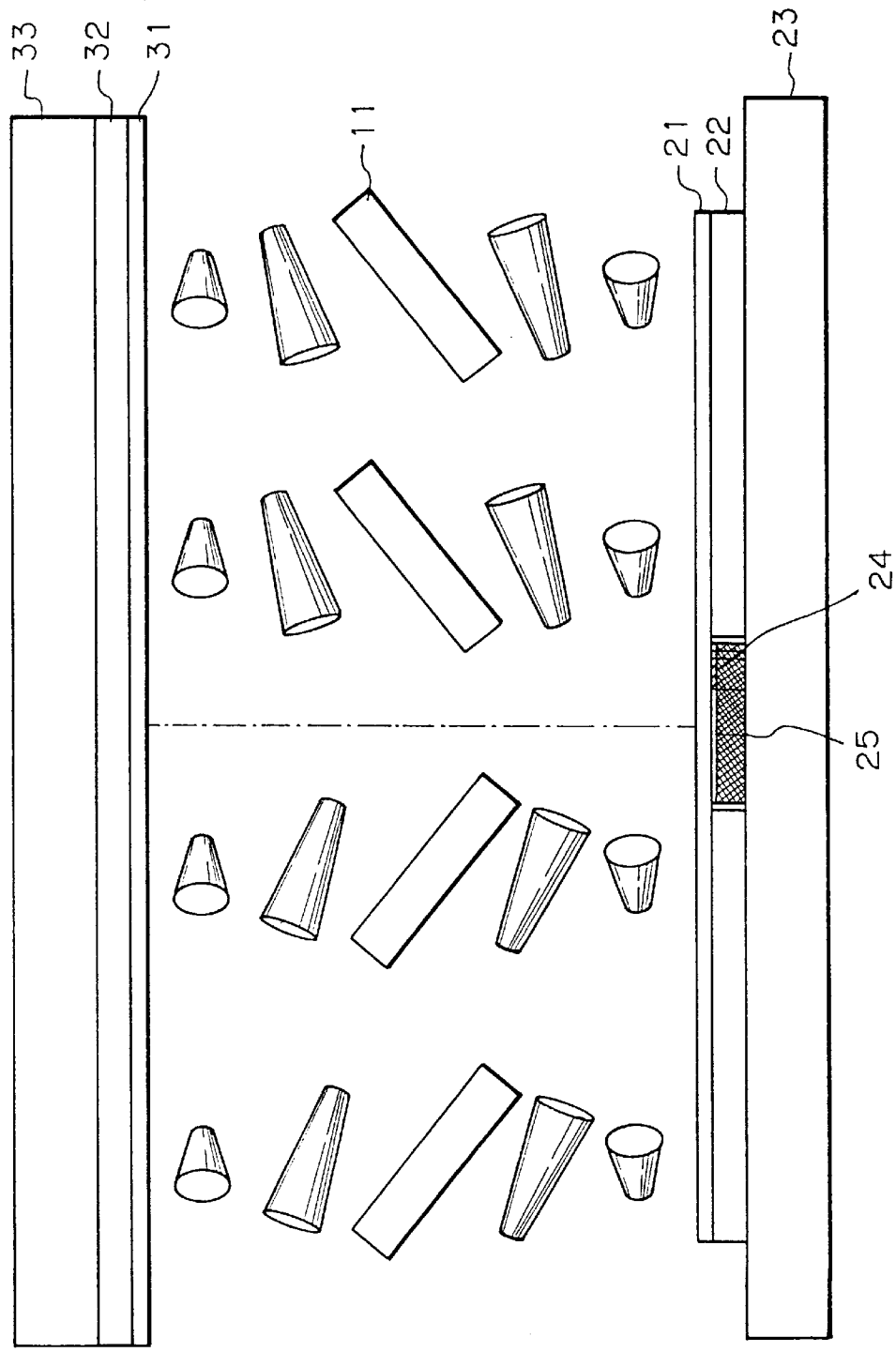
FIG. 3 is a section showing an LCD embodying the present invention.

Referring to FIG. 3, an LCD embodying the present invention is shown and includes two substrates 23 and 33. The substrates 23 and 33 respectively have electrodes 22 and 32 and sandwich a layer of LC molecules 11 therebetween. While FIG. 3 additionally shows alignment films 21 and 31 for illustrating LC alignment control, the films 21 and 31 do not constitute any essential part of the present invention. In the illustrative embodiment, the electrode 22 of one substrate 23 is formed with an aperture 24 and provided with a second electrode 25 aligning with the aperture 24. A particular voltage is capable of being applied to each of the two electrodes 22 and 25. In the actual LCD, polarizing films are positioned on both sides of the cell, although not shown in FIG. 3. While a voltage is not applied between the electrodes 32 and 22 facing each other, the molecules 11 remain parallel to the surfaces of the substrates 23 and 33. On the application of a voltage, the molecules 11 change their orientation in the direction of an electric field. As a result, the amount of light transmission of the LCD changes.

The aperture 24 and second electrode 25 aligning with the aperture 24 will be described more specifically. In a conventional LCD lacking the aperture 24 and second electrode 25, the direction in which LC molecules rise is determined by, e.g., a pretilt angle which depends on the alignment film and rubbing direction. In the illustrative embodiment, when, e.g., a voltage higher than a voltage applied between the electrodes 22 and 32 is applied between the second electrode 25 and the electrode 32, a non-uniform electric field is generated in the LC layer. As a result, the molecules 11 rise in, e.g., two directions shown in FIG. 3 within the individual pixel. This successfully improves the viewing characteristic of the LCD.

In the embodiment, the electrode or counter 32 is not formed with any aperture, so the substrate 33 does not need any microtreatment discussed in relation to Prior Art 2. Further, the second electrode 25 can be implemented as the same layer as a semiconductor constituting TFTs or similar matrix elements. this allows the second electrode 25 to be formed only if a mask for a photoresist step is changed. Therefore, the embodiment is practicable without any step added to the conventional procedure. Moreover, a voltage is applied even to the second electrode 25 in order to insure sufficient contrast. These advantages will be described more specifically with reference to FIGS. 4–6.

Figure 4:
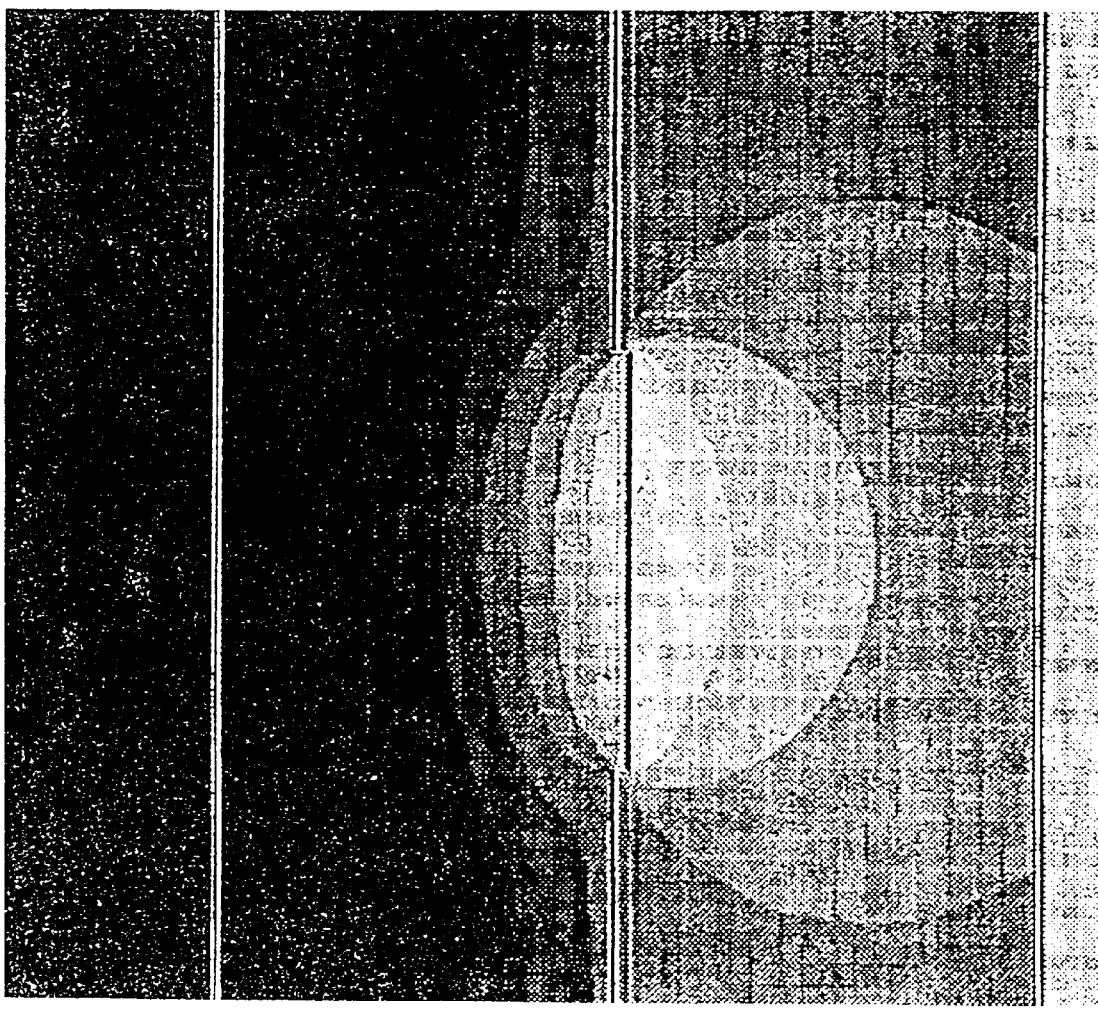
FIG. 4 shows the result of electric field simulation effected with the LCD of the present invention.
Figure 5:
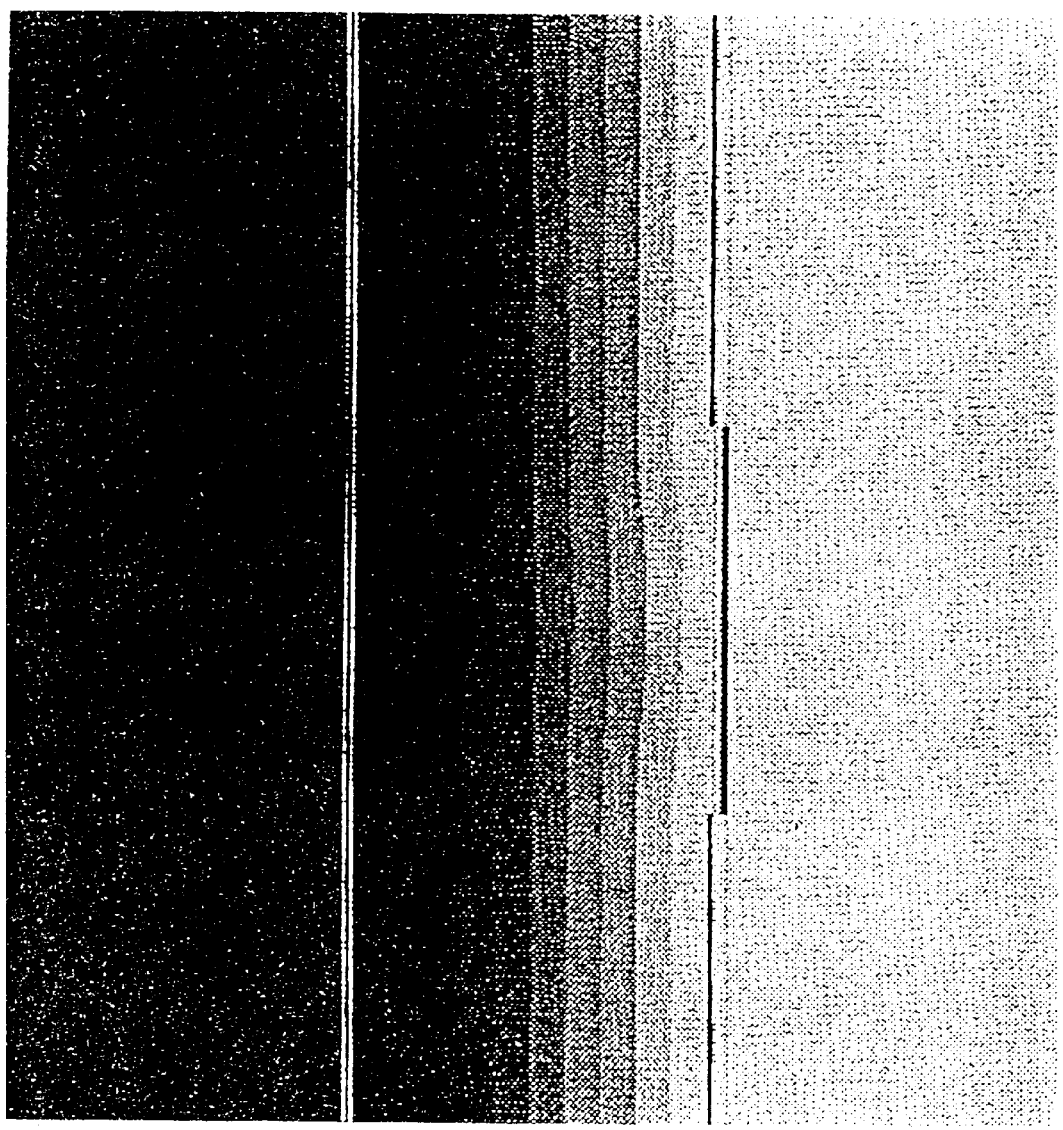
FIGS. 5 and 6 show the results of electric field simulation effected with comparative examples.
Figure 6:
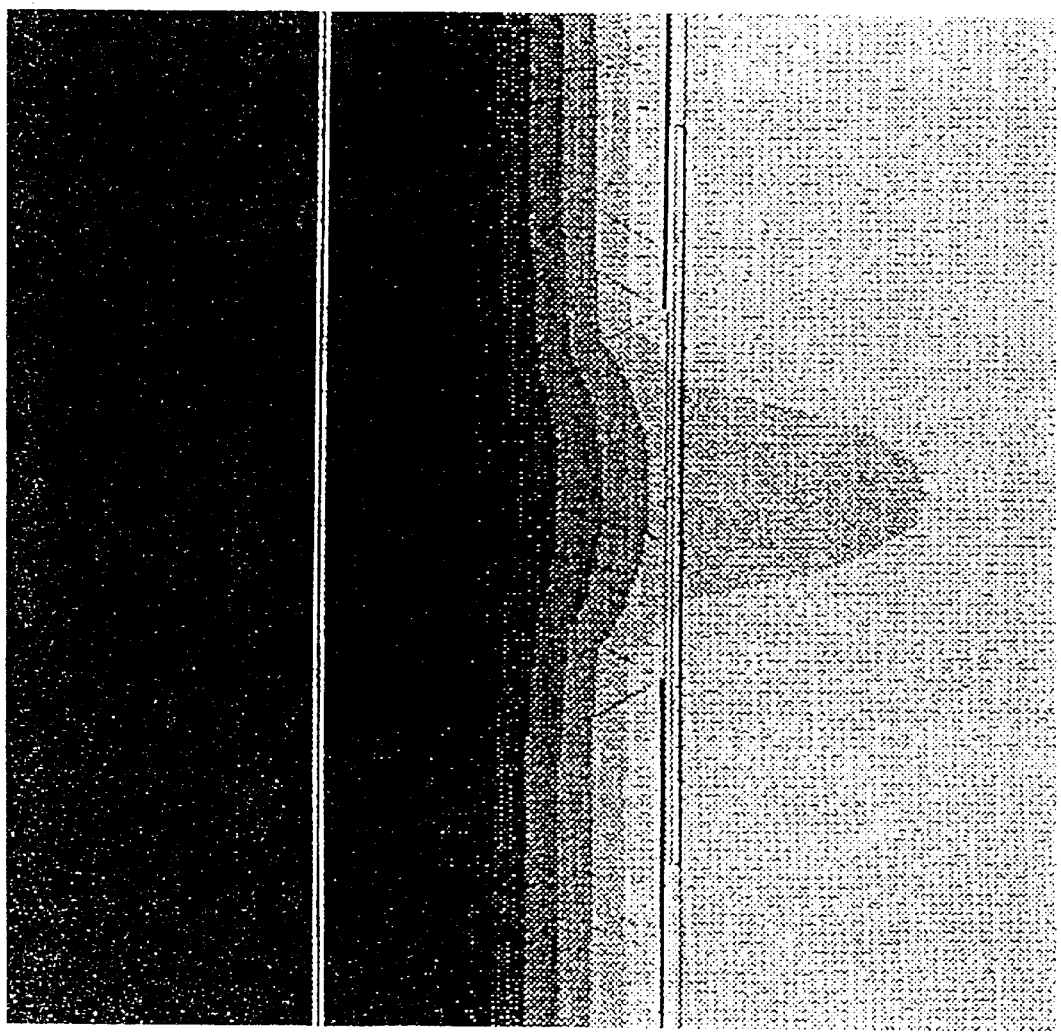

FIG. 4 shows the result of electric field simulation effected with a section of the LCD shown in FIG. 3. FIGS. 5 and 6 each shows the result of particular electric field simulation for comparison. Because the results shown in FIGS. 4–6 are representative of tonality, neither lines nor numerals for reference are shown for the sake of accuracy of tonality.

In FIG. 4, two horizontal lines at the center respectively correspond to the upper and lower electrodes 22 and 32 shown in FIG. 3. The electrodes 22 and 32 are spaced 5 $\mu$m from each other. The second electrode 25 is located at the center of the lower electrode 22, as viewed in the figure. The aperture 24 and electrode 25 are sized 6 $\mu$m each. For the simulation, 5 V and 8 V were applied to the electrodes 22 and 25, respectively. In FIG. 4, the regions of the same potential are represented by particular tonality.

As FIG. 4 indicates, the second electrode 25 applied with the voltage higher than the voltage applied to the electrode 22 forms a non-uniform electric field in the LC layer. The molecules 11 having a positive dielectrically anisotropic characteristic and of ordinary use tend to form an array parallel to the electric lines of force (i.e. vertical lines on the equipotential surface). Therefore, the electrode 25 causes the molecules 11 in the LC layer to rise in the directions shown in FIG. 3.

The result of simulation shown in FIG. 5 was obtained with an LCD lacking the aperture 24. For the simulation, 5 V was applied to both the electrode 22 and second electrode 25. As shown, equipotential lines remain parallel to the surfaces of the substrates. This prevents the LCD from achieving the advantages of the embodiment.

FIG. 6 shows the result of simulation effected with an LCD having the aperture 24, but lacking the second electrode 25. This configuration is identical with Prior Art 2 except for the replacement of the upper and lower substrates. As shown, the LCD implements some degree of non-uniform electric field. However, the non-uniform electric field is not as noticeable as in FIG. 4, failing to sufficiently control the rising direction of the LC molecules.

As stated above, the illustrative embodiment achieves not only the same advantages as Prior Art 2, but an advantage that it is capable of controlling the rising direction of the LC molecules to a greater degree with the non-uniform electric field.

In the above embodiment, at least one of two substrates facing each other with the intermediary of an LC layer is provided with an electrode formed with an aperture, and a second electrode is aligned with the aperture. It should be noted that the alignment of the second electrode with the aperture refers to a condition wherein when the LCD is seen in a front view, the aperture and electrode are located substantially at the same position and superposed on each other. Stated another way, when the LCD is seen in a section, the alignment does not mean that the electrode is located at the same position as the aperture. Therefore, the aperture and electrode may be implemented as a single layer or as two layers one of which is closer to the front than the other, as desired.

Assume that the illustrative embodiment is applied to a TFT drive LCD. Then, although the aperture and second electrode may be implemented as a layer independent of TFT layers, it is preferable to implement them as the same layer as one of the TFT layers in order to prevent the number of steps from increasing. For example, the second electrode 25 may be implemented by a chromium layer constituting a gate electrode layer, and a photoresist step is effected at the same time.

The TFT structure with which the embodiment is practicable may be either a staggered structure or an inverse staggered structure. In addition, the second electrode 25 may be included in any one of the staggered layers or may be implemented as an additional layer.

It is not necessary that the aperture 24 and second electrode 25 be provided with the same size. The aperture 24 may be greater than or smaller than the second electrode 25, as desired.

In FIG. 3, the molecules 11 are assumed to have a positive dielectrically anisotropic characteristic and the initial alignment parallel to the substrates 23 and 33. Alternatively, the molecules 11 may have a negative dielectrically anisotropic characteristic and homeotropic alignment perpendicular to the substrates 23 and 33, if desired. In addition, the LC material is not limited to the TN type material having a twist angle of 90°, but may be replaced with a super-twisted TN (STN) material or a ferroelectric material.

An alternative embodiment of the present invention will be described hereinafter. This embodiment is characterized in that an electrode is provided on at least one of opposite substrates, and in that a second electrode is provided on, but insulated from, the electrode. Even with this configuration, it is possible to achieve the advantages discussed with reference to FIGS. 3 and 4 and to realize a great viewing angle.

Figure 8:
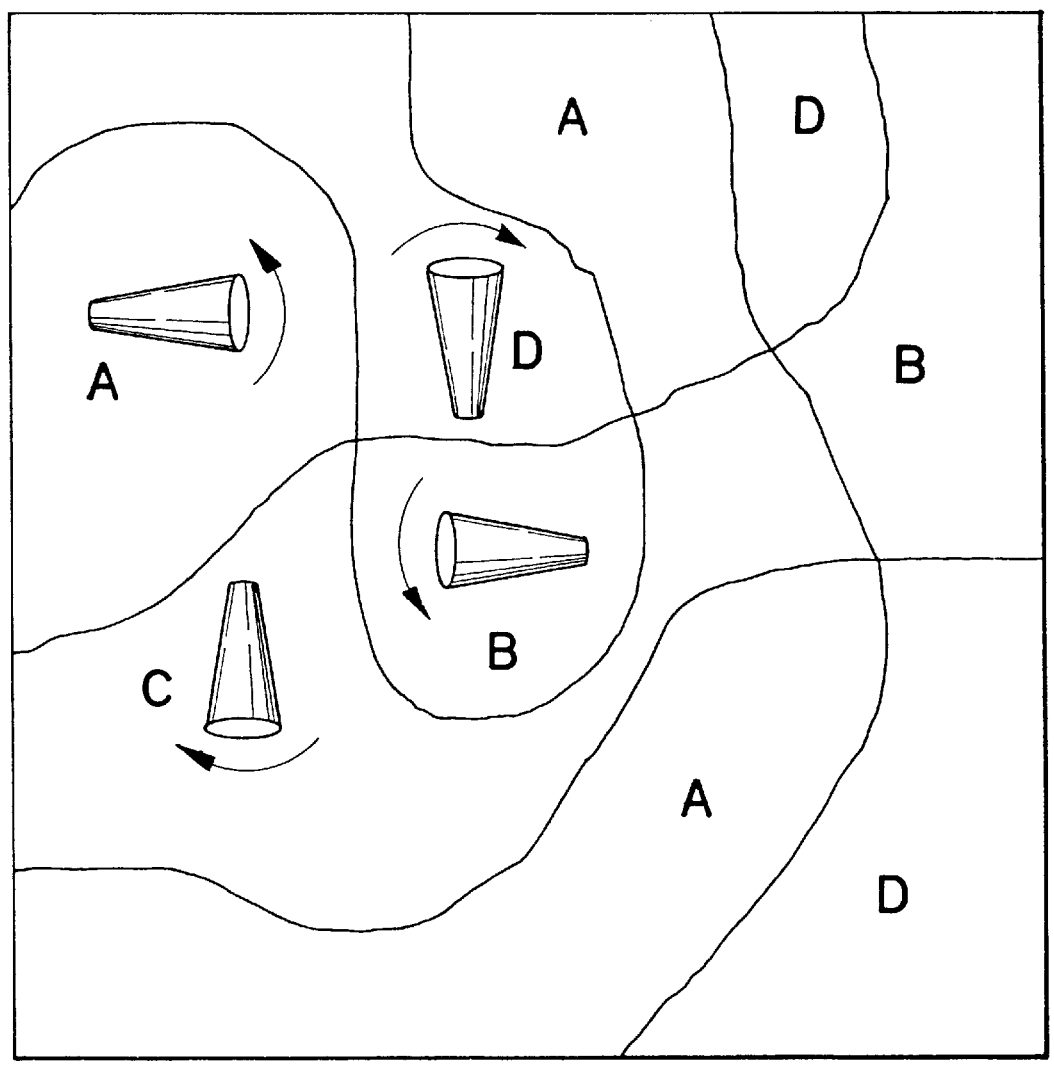
FIG. 8 is a view for describing an LCD which have already proposed.

In FIG. 3, the directors of the LC twist in the same direction while the molecules 11 rise in opposite directions in two different areas. We have already proposed an LCD with a great viewing angle and free from tonality inversion in Japanese Patent Application No. 7-273614. This LCD uses alignment films not limiting the rising direction of the molecules 11 to one direction, and an LC material in which the twisting direction of the director is not limited to one direction. Such an LCD allows four regions different in the twisting direction of the director and in the rising direction of LC molecules to occur automatically within the individual pixel. Specifically, as shown in FIG. 8, in the LC layer of our prior proposal, the individual pixel has four regions A, B, C and D different in the twisting direction of the vector and in the rising direction of molecules. Because four regions in which the rising direction of the molecules are sequentially deviated by 90° coexist in the individual pixel, the LCD achieves a great viewing angle and is free from tonality inversion even when seen in the oblique direction.

However, extended researches showed us that because the LCD of our prior application stated above causes each pixel to be divided into four kinds of regions at random, and therefore appears rugged when seen from the side. We found that by combining the LCD of the prior application and one of the two embodiments described above, it is possible to implement an LCD having a great viewing angle and free from ruggedness when seen from the side. Specifically, by using the non-uniform electric field derived from the combination of the electrode having the aperture and the second electrode aligning with the aperture or from the second electrode provided on, but insulated from, the electrode, there can be realized an LCD in which each pixel is accurately divided into four regions different in the twisting direction of the director and in the rising direction of the LC molecules.

In the LCD having the individual pixel divided into four regions, it is desirable that the second electrode be located on the diagonal lines (in the diagonal direction) of the individual pixel. For example, and with reference to FIG. 7 the second electrode 25a may be configured in the form of a letter X so as to divide each pixel into four regions along the diagonal lines. As a result, an LCD with a great viewing angle is achieved. It is to be noted that the diagonal lines may not be strictly diagonal, but may be slightly deformed or bent so long as they can substantially equally divide one pixel.

Generally, in a color LCD, R (red), G (green) and B (blue) pixels are arranged side by side to constitute a square unit pixel. Specifically, the R, G and B pixels each is not square, but is oblong and has a vertical-to-horizontal ratio of 3:1 by way of example. In this case, the control over the rising direction of LC molecules is easy in the horizontal direction in which the distance is short, but difficult in the vertical direction in which the distance is long. For example, in FIG. 7, the regions C and D are less stable than the regions A and B; the voltage, cooling rate and other conditions for producing the regions A, B, C and D evenly are extremely limited.

Another alternative embodiment of the present invention to be described is capable of quadrisecting the individual pixel stably and easily by broadening the range of applicable voltages and the range of applicable cooling rates. Briefly, this embodiment is characterized in that the second electrode includes a portion parallel to the longer sides of a pixel.

Figure 7:
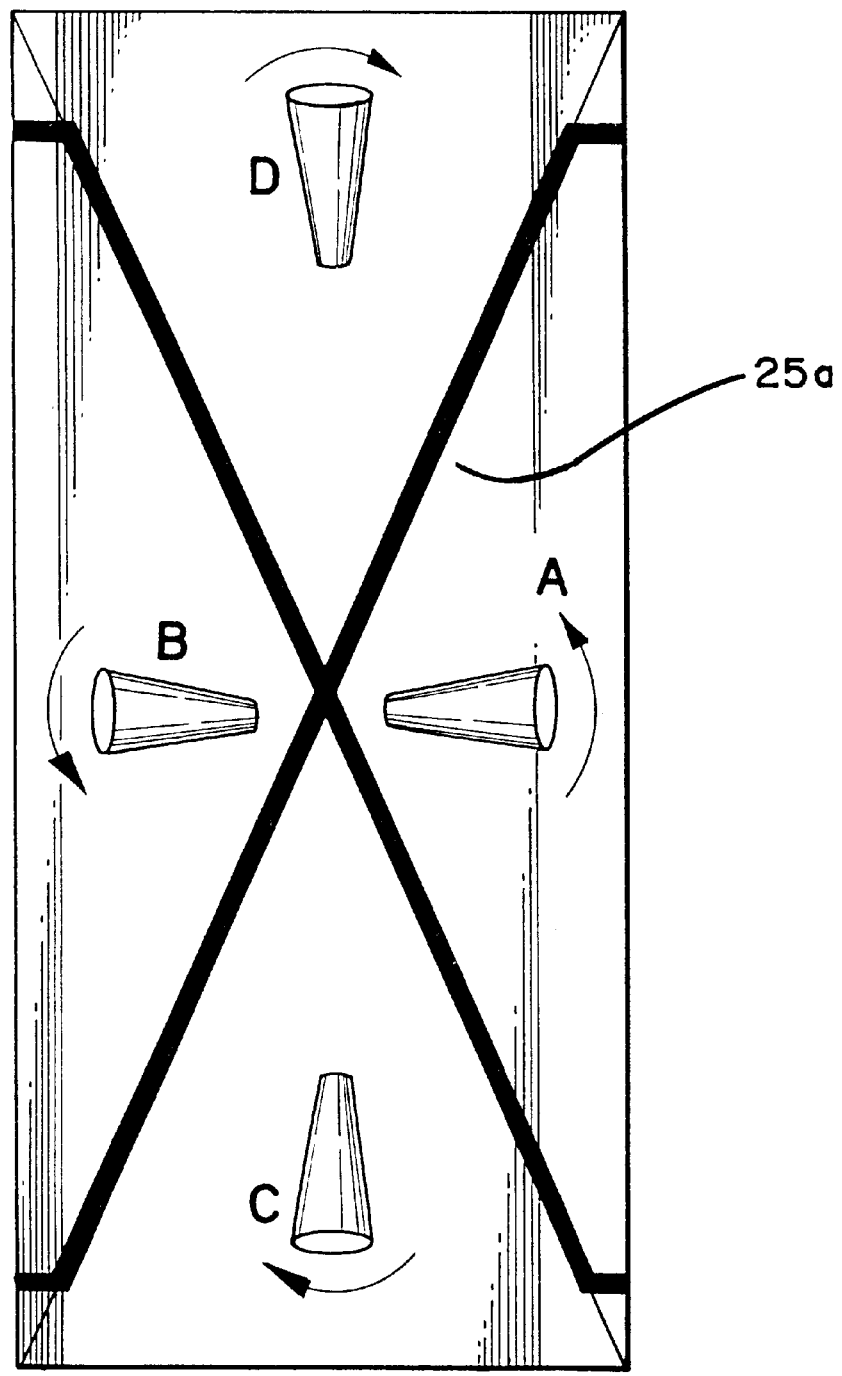
FIG. 7 is an enlarged view showing a specific LC layer included in the LCD of the present invention.
Figure 9:
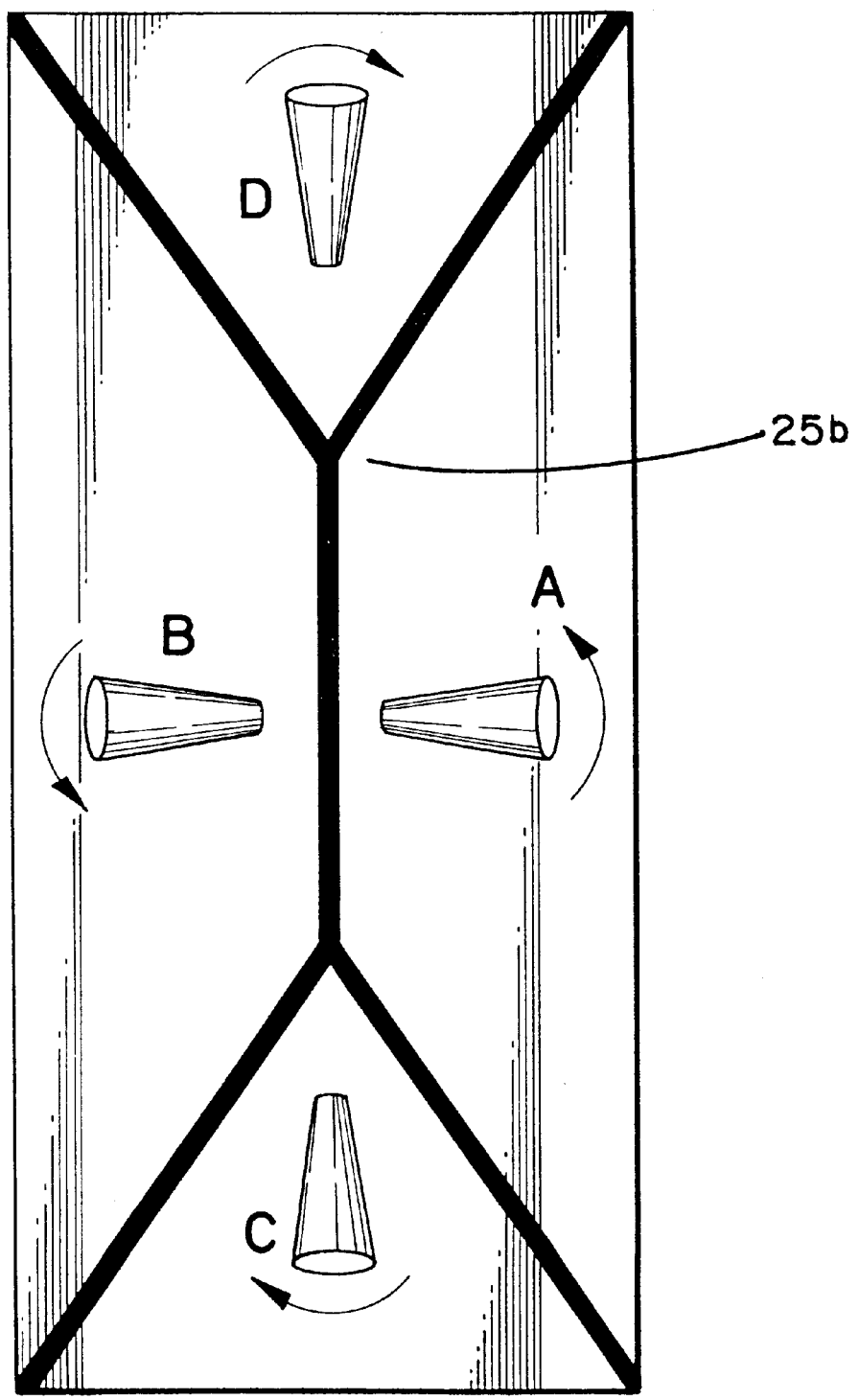
FIGS. 9–11 are enlarged views each showing another specific LC layer included in the LCD of the present invention.
Figure 10:
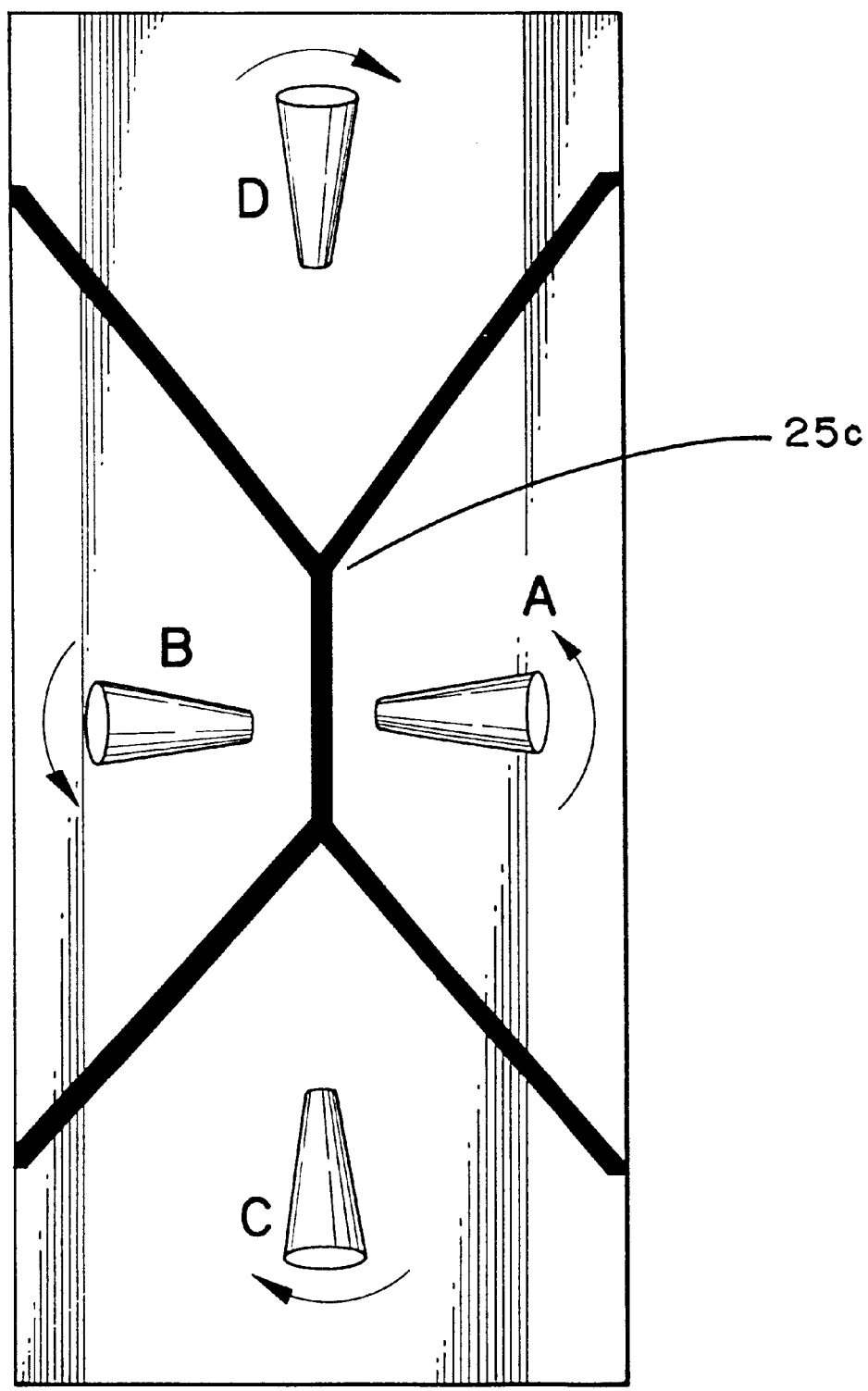
Figure 11:
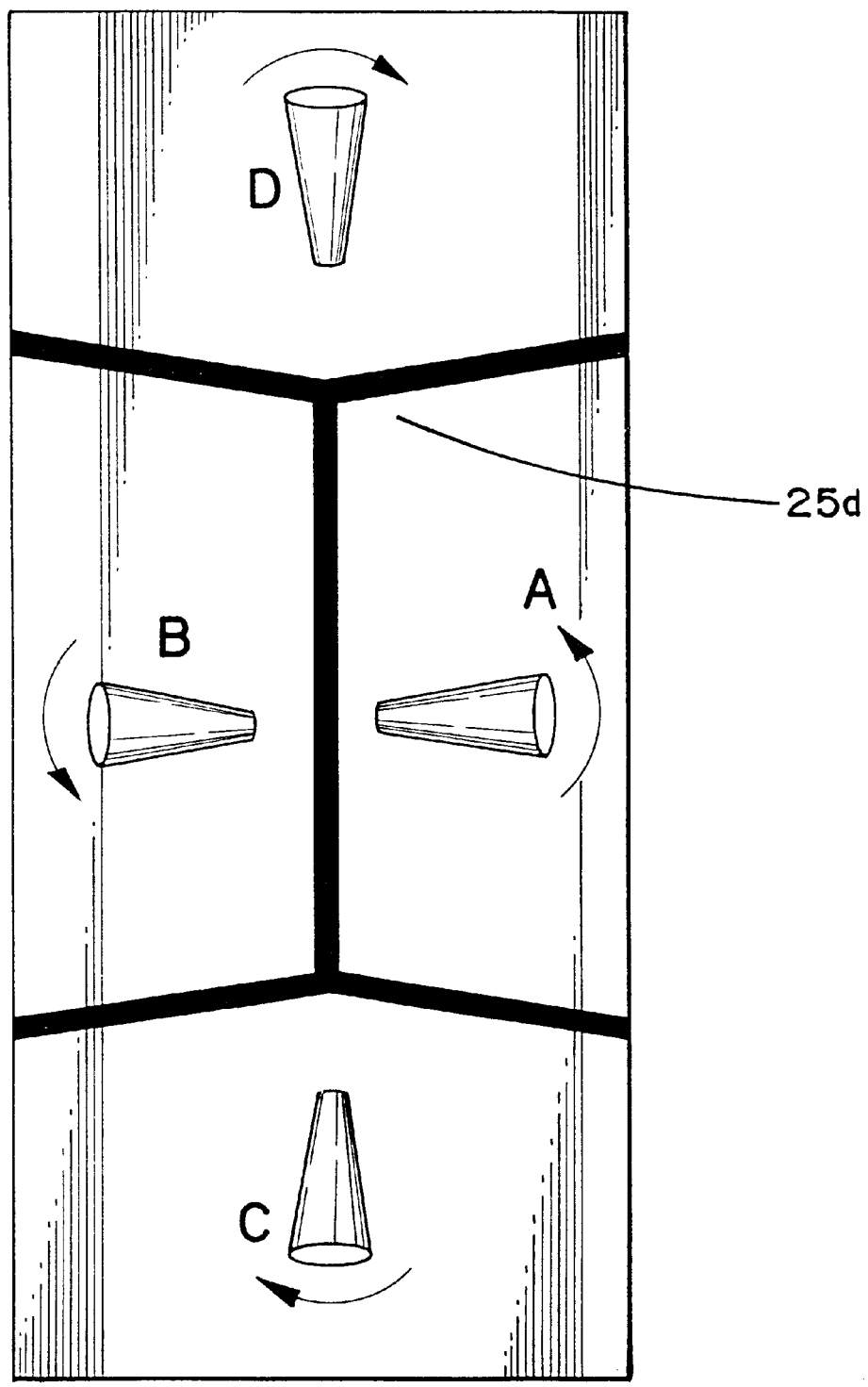

Specifically, as shown in any one of FIGS. 9–11, the portions of the second electrode 25b, 25c, 25d respectively delimiting the regions C and D are shorter than the corresponding portions shown in FIG. 7. With this configuration, the second electrode allows the regions C and D to be formed more stably and easily and broadens the range of applicable voltages and that of applicable cooling rates. In any one of FIGS. 9–11, it may appear that the contrast of the LCD is lowered due to the leakage of light through the line along which the regions A and B adjoin. However, in the LCD of the present invention wherein the regions different in twisting direction are generated in the regions identical in twisting direction with priority, the region C or D is generated in the form of a string between the regions A and B. As a result, the contrast of the LCD is not lowered at all.

Referring again to FIG. 3, how the LCD of the present invention is produced and driven will be described. In a first embodiment of the method of producing the LCD and the method of driving it in accordance with the present invention, a voltage applied to the second electrode 25 at the time of drive is higher than a voltage applied to the surrounding electrode 22, as in the conventional LCD. This provides the molecules 11 with a desirable rising characteristic and a desirable viewing angle, as shown in FIG. 3. The voltage to be applied to the second electrode 25 may be the same throughout all the pixels or may be different between the pixels (in relation to, e.g., the pixel electrodes). In any case, the rising direction of the molecules 11 can be controlled in the manner shown in FIG. 3.

In the first embodiment, LC is injected into an LC panel. Then, the LC panel is heated to a temperature higher than the isotropic phase to LC layer transition temperature. Subsequently, the LC panel is cooled to a temperature lower than the above transition temperature. At this cooling stage, (1) a voltage higher than a voltage to be applied between the electrode with the aperture and the counter electrode facing it is applied between the second electrode and the counter electrode, or (2) a voltage higher than a voltage to be applied to the electrode on the substrate and the counter electrode is applied between the second electrode and the counter electrode.

The voltage applied at the cooling stage by either one of the above schemes (1) and (2) causes the rising directions of the molecules 11 to be memorized. Therefore, at the time of driving following the cooling stage, it is not necessary to apply the voltage to the second electrode 25, i.e., all that is required is to apply the voltage to the electrode 22, as in the conventional LCD.

A second embodiment of the LCD producing method and driving method in accordance with the present invention is characterized in that to memorize the rising directions of the molecules 11 during cooling, the LCD contains a small amount of organic polymer. Particularly, it is desirable to inject LC containing a monomer or an oligomer between the substrates, and cause it to react within the LC. The resulting polymer will be evenly distributed in the LC and will stabilize the rising directions of the molecules.

To make a polymer out of the monomer or the poligomer by reaction, the monomer or the poligomer may be caused to react (i) in the isotropic phase, (ii) in the LC layer, or (iii) in both the isotropic phase and LC layer. Generally, the above scheme (i) allows the resulting high molecules to help the regions different in the twisting direction and in the rising direction exist stably. The scheme (ii) presumably allows the high molecules to memorize the alignment direction of LC positively. However, such a difference between the schemes (i) and (ii) is not definite. With any one of the schemes (i) and (ii), it is possible to produce the LCD of this embodiment.

The monomer or the oligomer may be selected from a group of photosetting monomers, a group of thermosetting monomers, or a group of oligomers thereof. Further, the monomer or the oligomer may contain any other suitable component.

A group of photosetting monomers or oligomers include not only ones reactive to visible rays but also ultraviolet (UV) setting monomers reactive to ultraviolet rays. The UV setting monomers are particularly desirable from the easy operation standpoint.

The polymer applicable to this embodiment may have a structure similar to LC molecules containing a liquid crystalline monomer or oligomer. However, a flexible polymer having alkylene chains because the polymer is not always used for the alignment purpose. In addition, use may be made of any one of monofunctional monomers, bifunctional monomers, and multifunctional monomers.

The UV setting monomers applicable to this embodiment include 2-ethylhexylacrylate, butylethylacrylate, butoxyethylacrylate, 2-cyanoethylacrylate, benzilacrylate, cyclohexylacrylate, 2-hydroxypropylacrylate, 2-etoxyethylacrylate, NUN-diethylaminoethylacrylate, NUN-dimethylaminoethylacrylate, dicyclopentanylacrylate, dicyclopentenylacrylate, glycydilacrylate, tetrahydrofurfrilacrylate, isobonylacrylate, isodecylacrylate, laurylacrylate, morpholineacrylate, phenoxyethylacrylate, phenoxydiethyleneglycolacrylate, 2,2,2-trifloroethylacrylate, 2,2,3,3,3-pentafloropropylacrylate, 2,2,3,3-tetrafloropropylacrylate, 2,2,3,4,4,4-hexaflorobutylacrylate, and other monofunctional acrylate compounds.

Also applicable to this embodiment are monofunctional metacrylate compounds including 2-ethylhexylmetacrylate, butylethylmetacrylate, butoxyethylmetacrylate, 2-cyanoethylmetacrylate, benzilmetacrylate, cyclohexylmetacylate, 2-hydroxypropylmetacrylate, 2-etoxyethylmetacrylate, NUN-diethylaminoethylmetacrylate, NUN-dimethylaminoethylmetacrylate, dicyclopentanylmetacrylate, dicyclopentenylmetacrylate, glycidylmetacrylate, tetrahydrofurfrylmetacrylate, isobonylmetacrylate, isodecylmetacrylate, laurylmetacrylate, morphorinemetacrylate, phenoxyethylmetacrylate, phonoxydiethyleneglycolmetacrylate, 2,2,2-trifloroethylmetacrylate, 2,2,3,3-tetrafloropropylmetacrylate, and 2,2,3,4,4,4-hexaflorobutylmetacrylate.

Further, there may be used any one of multifunctional acrylate compounds including 4,4'-biphenyldiacrylate, 1,4-bisacryloyloxybenzene, 4,4'-bisacryloyloxydiphynylether, 4,4'-bisacryloyloxydiphynylether, 3,9-bis[1,1-dimethyl-2-acryloyloxyethyl]-2,4,8,10-tetraspiro[5,5]undecane, α,α'-bis[4-acryloyloxyphenyl]-1,4-diisopropylbenzene, 1,4-bisacryloyloxytetraflorobenzene, 4,4'-bisacryloyloxyactaflorobiphenyl, diethyleneglycolacrylate, 1,4-butandioldiacrylate, 1,3-buthyleneglycoldiacrylate, dicyclopentanyldiacrylate, glyceroldiacrylate, 1,6-hexandioldiacrylate, neopentylglycoldiacrylate, tetraehtyleneglycoldiacrylate, trimethylolpropanetriacrylate, pentaerythritoltetraacrylate, ditrimethylolpropanetetraacrylate, dipentaerythlitolhexaacrylate, dipentaerythritolmonohydroxypentaacrylate, dipentaerythritolmonohydroxypentaacrylate, 4,4'-diacryloiloxydimethylstilben, 4,4'-diacryloiloxydiethylstilben, 4,4-diacryloiloxypropylstilben, 4,4'-diacryloiloxydibutylstilben, 4,4'-diacryloiloxydipentylstilben, 4,4'-diacryloiloxydihexylstilben, 4,4'-diacryloiloxydiflorostilben, 4,4'-diacryloiloxydiflorostilben, 2,2-3,3-4,4-hexafloropentanediol-1,5-diacrylate, 1,1,2,2,3,3-hexafloroproppyl-1,3-diacrylate, and urethane olygomer.

Additionally available are multifunctional metacrylate compounds including diethyleneglycolmetacrylate, 1,4-butanediolmetacrylate, 1,3-butyleneglycoldimetacrylate, dicyclopendanyldimetacrylate, glyceroldimetacylate, 1,6-hexandioldimetacryolate, neopentylglycoldimetacrylate, tetraethyleneglycoadimetacrylate, trimethylolpropanetrimetacrylate, pentaerythritoltetrametacrylate, pentaerythritoltrimetacrylate, ditrimethylolpropanetetrametacrylate, dipentaerythritolhexametacrylate, dipentaerythritolmonohydroxypentametacrylate, 2,2,3,3,4,4-hexafloropentandiol-1,5-dimetacrylate, and urethanemetacrylate olygomer, and styrene, aminostyrene, and vinyl acetate.

Moreover, the drive voltage for driving the elements of this embodiment is effected also by interaction at the interface between the polymeric material and the LC material. In light of this, there may be used a polymer containing a fluorine element, e.g., a polymer synthesized from a compound containing 2,2,3,3,4,4-hexafloropendanediol-1,5-diacrylate, 1,1,2,2,3,3-hexafloropropyl-1,3-diacrylate, 2,2,2-trifloroethylacrylate, 2,2,3,3,3-pendafloropropylacrylate, 2,2,3,3-tetrafloropropylacrylate, 2,2,3,4,4,4-hexaflorobutylacrylate, 2,2,2-trifloroethylmetacrylate, 2,2,3,3-tetrafloropropylmetacrylate, 2,2,3,4,4,4-hexaflorobutylmetacrylate, or urethaneacrylate oligomer.

When the polymer is implemented by a photosetting or UV setting monomer, use is generally made of an initiator for light or UV rays. The initiator may be 2,2-diethoxyacetophenone, 2-hydroxy-2-methyl-1-phenyl-1-on, 1-(4-isopropylphenyl)-2-hydroxy-2-methylpropane-1-on, 1-(4-dodecylphenyl)-2-hydroxy-2-methylpropane-1-on or similar acetophenone, or benzoinmethylether, benzoinethylether, benzylmethylcetanol or similar benzoin, or benzophenone, benzoyl benzoic acid, 4-phenylbenzophenone, 3,3-dimethyl-4-methoxybenzophenone or similar benzophenone, or thioxanthone, 2-chlorthioxanthone, 2-methylthioxanthone or similar thioxantone, or any one of diazonium salts, sulphonium salts, iodonium salts and selenium salts.

Examples of the present invention and Comparative Examples will be described hereinafter.

EXAMPLE 1

A substrate having an amorphous silicon TFT array was formed on a glass substrate by repeating a film forming step and a photolithographic step. The TFT array had 480×640×3 pixels sized 100 µm×300 µm each, and a diagonal display size of 240 mm. In Example 1, the TFT had an inverse staggered structure consisting of a gate-chromium layer, a silicon nitride-insulating layer, an amorphous silicon-semiconductor layer, a drain and source-chromium layer, and a pixel-ITO layer, as named from the substrate side. A 5 µm wide diagonal aperture in the form of a letter X is formed in the ITO layer of each pixel electrode, and an electrode also in the form of a letter X and aligning with the aperture was formed of chromium. The structure was so designed as to apply a voltage to the electrode independently of a voltage meant for the pixel portion. Because the electrode was implemented by the same layer as the gate electrode, i.e., the chromium layer, no extra steps were needed.

An RGB color filter substrate was used as a substrate facing the above substrate. After the two substrates were rinsed, the alignment films 21 and 31, FIG. 3, were applied thereto by spin coating, and then baked at 90° C. and 220° C. The alignment films 21 and 31 were implemented by a polyimide alignment material JALS-428 (trade name; available from Japan Synthetic Rubber). Subsequently, the substrates were rubbed by a buffing cloth formed of rayon. Rubbing was effected in the diagonal directions of the substrates; the rubbing direction of the upper substrate and that of the lower substrate were different by 90°. Adhesive was applied to the edge portions of the substrates, and then latex balls having a diameter of 6 µm each were sprayed as a spacer. Thereafter, the two substrates were aligned and adhered together under the application of a pressure. The adhered substrates were placed in a vacuum tank. After the tank was evacuated, nematic LC ZLI 4792 (trade name) was injected into the substrate assembly. Two polarizer films were adhered to the resulting LC panel perpendicularly to each other, completing an LCD.

8 V was applied to the X-shaped electrode of the LCD in order to effect display in the conventional manner. A voltage for pixel display was about 5.5 V. The LCD was free from tonality inversion in all directions and achieved a great viewing angle free from ruggedness when seen from the side.

The condition of the individual pixel was observed through a microscope under the application of the voltage. The observation showed that each pixel was divided into the four regions A–D, FIG. 7, and that the regions A–D were different in twisting direction and rising direction when the substrates were tilted for observation.

Further, the viewing angle characteristic of the LCD during tonality display was measured at the intervals of 45° in terms of orientation angle. For the measurement, use was made of an LC evaluating device LCD-5000 (trade name). It was found that the LCD had substantially the same viewing angle characteristic in all directions, and did not show any tonality inversion within the angular range of 60°.

Comparative Example 1

An LCD was produced and driven in the same manner as in Example 1 except that a voltage was not applied to the X-shaped electrode. The LCD caused tonality inversion and many after images to occur. Disclination occurred in the individual pixel and sequentially changed from the time just after the application of a voltage, as observed through a microscope.

EXAMPLE 2

An LCD panel was produced in the same manner as in Example 1 except that a TFT array had a staggered structure. Specifically, a substrate having an amorphous silicon TFT array was formed on a glass substrate by repeating a film forming step and a photolithographic step. The TFT array had 480×640×3 pixels sized 100 µm×300 µm each, and a diagonal display size of 240 mm. In Example 2, the TFT had a staggered structure consisting of a pixel-ITO (Indium Tin Oxide) layer, a source and drain-chromium layer, an amorphous silicon-semiconductor layer, a silicon nitride-insulating layer, and a gate-chromium layer.

A 5 µm wide diagonal aperture in the form of a letter X is formed in the ITO layer of each pixel electrode, and an electrode also in the form of a letter X and aligning with the aperture was formed of chromium. The structure was so designed as to apply a voltage to the electrode independently of a voltage meant for the pixel portion. Because the electrode was implemented by the same layer as the gate electrode, i.e., the chromium layer, no extra steps were needed.

An LCD panel was assembled and filled with LC so as to produce an LCD. 8 V was applied to the X-shaped electrode of the LCD in order to effect display in the conventional manner. A voltage for pixel display was about 5 V. This LCD was also free from tonality inversion in all directions and achieved a great viewing angle free from ruggedness when seen from the side.

EXAMPLE 3

A TFT substrate was produced in the same manner as in Example 1 and combined with a color filter substrate in order to assemble an LCD panel. The substrates adhered together were placed in a vacuum tank. After the tank was evacuated, an LC solution consisting of nematic LC ZLI 4792, 0.2 wt % of UV setting monomer KAYARADPET-30

(trade name; available from Nippon Kayaku) and 5 wt % (with respect to the monomer) of initiator Iluganox 907 (trade name) was injected into the substrate assembly. The resulting panel was heated up to 110° C. and then illuminated by ultraviolet rays (0.1 mW/cm$^2$) for 30 seconds at 110° C. Subsequently, while a 10 V, 5 Hz sinusoidal voltage and a 5 V, 5 Hz sinusoidal voltage were respectively applied to the X-shaped electrodes and pixels, the panel was cooled at a rate of 20° C./min.

In the above panel, each pixel was successfully divided into four regions in accordance with the configuration of the X-shaped electrode, as observed through a polarizing microscope. When the cell was tilted, the four regions were found to rise in the directions shown in FIG. 7 on the basis of a change in brightness.

The voltage to the X-electrode was interrupted in order to effect display in the ordinary condition. The resulting viewing angle was great and free from tonality inversion even with halftone. The LC rose in four different regions in accordance with the configuration of the X-shaped electrode, as observed through a microscope. The viewing angle characteristic of the LCD during tonality display was measured at the intervals of 45° in terms of orientation angle. For the measurement, use was made of the previously mentioned LC evaluating device LCD-5000. It was found that the LCD had substantially the same viewing angle characteristic in all directions, and did not show any tonality inversion within the angular range of 60°.

Comparative Example 2

An LCD was produced and driven in the same manner as in Example 2 except that a voltage was not applied to the X-shaped electrode. In the LCD, each pixel was not regularly divided into four regions, causing the LCD to appear rugged when seen in the oblique direction.

EXAMPLE 4

A substrate having an amorphous silicon TFT array was formed on a glass substrate by repeating a film forming step and a photolithographic step, as in Example 1. The TFT array had 480×640×3 pixels sized 100 μm×300 μm each, and a diagonal display size of 240 mm. The aperture was not formed in the ITO of the individual pixel electrode. Further, after the individual pixel was covered with a nitride film, an X-shaped electrode of chromium was formed at the center of the pixel. For the other substrate, use was made of an RGB color filter. The two substrates were adhered together in the same manner as in Example 1, and then an LCD was produced in the same manner as in Example 1.

A 5 μm wide diagonal aperture in the form of a letter X is formed in the ITO layer of each pixel electrode, and an electrode also in the form of a letter X and aligning with the aperture was formed of chromium. The structure was so designed as to apply a voltage to the electrode independently of a voltage meant for the pixel portion. Because the electrode was implemented by the same layer as the gate electrode, i.e., the chromium layer, no extra steps were needed.

An LCD panel was assembled and filled with LC so as to produce an LCD. 8 V was applied to the X-shaped electrode of the LCD in order to effect display in the conventional manner. A voltage for pixel display was about 5 V. This LCD was also free from tonality inversion in all directions and achieved a great viewing angle free from ruggedness when seen from the side.

In the above panel, each pixel was divided into four regions in accordance with the configuration of the X-shaped electrode, as observed through a polarizing microscope. When the cell was tilted, the four regions were found to rise in the directions shown in FIG. 7 on the basis of a change in brightness.

The voltage to the X-electrode was interrupted in order to effect display in the ordinary condition. The resulting viewing angle was great and free from tonality inversion even with halftone. The LC rose in four different regions in accordance with the configuration of the X-shaped electrode, as observed through a microscope. The viewing angle characteristic of the LCD during tonality display was measured at the intervals of 45° in terms of orientation angle. For the measurement, use was made of the previously mentioned LC evaluating device LCD-5000. It was found that the LCD had substantially the same viewing angle characteristic in all directions, and did not show any tonality inversion within the angular range of 60°.

EXAMPLE 5

An LC panel was produced in the same manner as in Example 3 except that the electrode shown in FIG. 9 was used. The sinusoidal voltage applied to the second electrode was sequentially varied from 5 V to 20 V while the cooling rate of the substrates were sequentially varied from 5° C./min to 20° C./min. In all such conditions, the individual electrode was successfully quadrisected in accordance with the configuration of the electrode. Tonality conversion did not occur in any direction within the viewing angle of 60°.

In summary, in accordance with the present invention, an LCD can be driven with a voltage higher than a voltage applied between an electrode having an aperture and a counter electrode to be applied between a second electrode and the counter electrode. The LCD is free from tonality inversion and has a great viewing angle over which white does not appear during the display of black. Further, the LCD has high contrast. In addition, the LCD can be produced by a simple procedure needing no extra steps.

Various modifications will become possible for those skilled in the art after receiving the teachings of the present disclosure without departing from the scope thereof.

What is claimed is:

1. A liquid crystal display (LCD) comprising:

a first substrate with a first electrode thereon, said first electrode having an aperture therein that defines first and second regions of said first electrode that are directly adjacent to opposite sides of said aperture;

a second substrate with a second electrode thereon, said first electrode facing and being spaced from said second electrode;

a liquid crystal (LC) layer sandwiched between said first and second electrodes, LC molecules in said LC layer rising when a first voltage is applied between said first and second electrodes; and a third electrode on said first substrate and aligned with said aperture, said third electrode causing LC molecules in a first portion of said LC layer that is adjacent to said first region to rise in a direction that is different from a rising direction of LC molecules in a second portion of said LC layer that is adjacent to said second region when a second voltage different from the first voltage is applied between said second and third electrodes and the first voltage is applied between said first and second electrodes.

2. The LCD of claim 1, further comprising a thin film transistor having plural electrode layers connected to drive the LCD, said third electrode being independent of said plural electrode layers and on a same level as one of said plural electrode layers.

3. The LCD of claim 1, wherein said third electrode is entirely within said aperture on a same level as said first electrode.

* * * * *